United States Patent Office 2,922,400
Patented Jan. 26, 1960

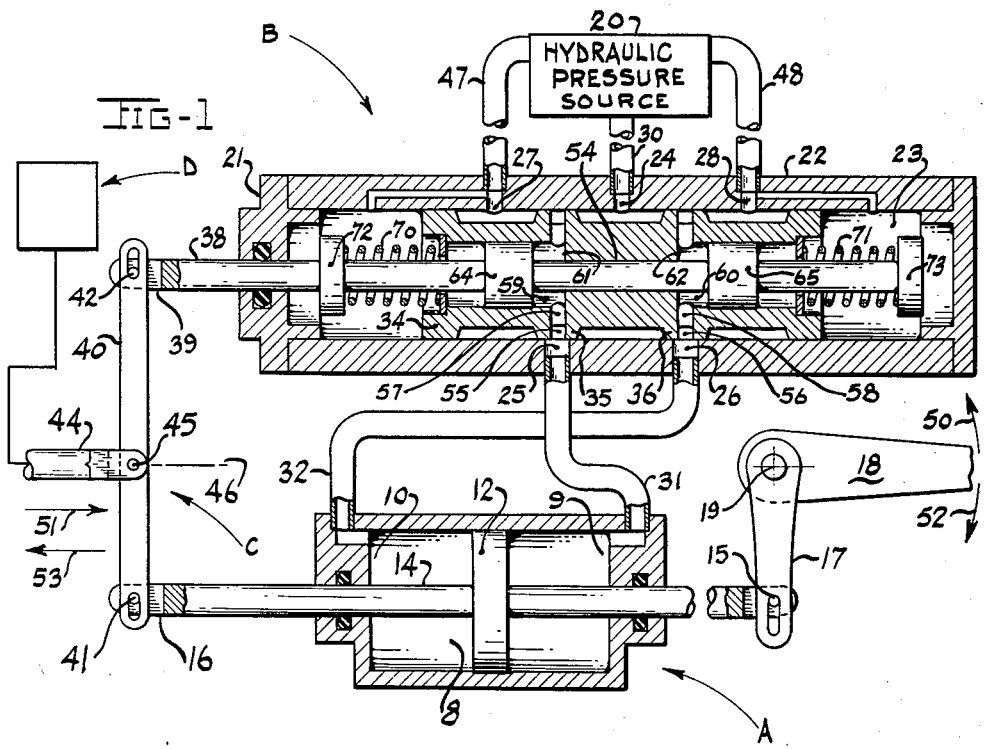
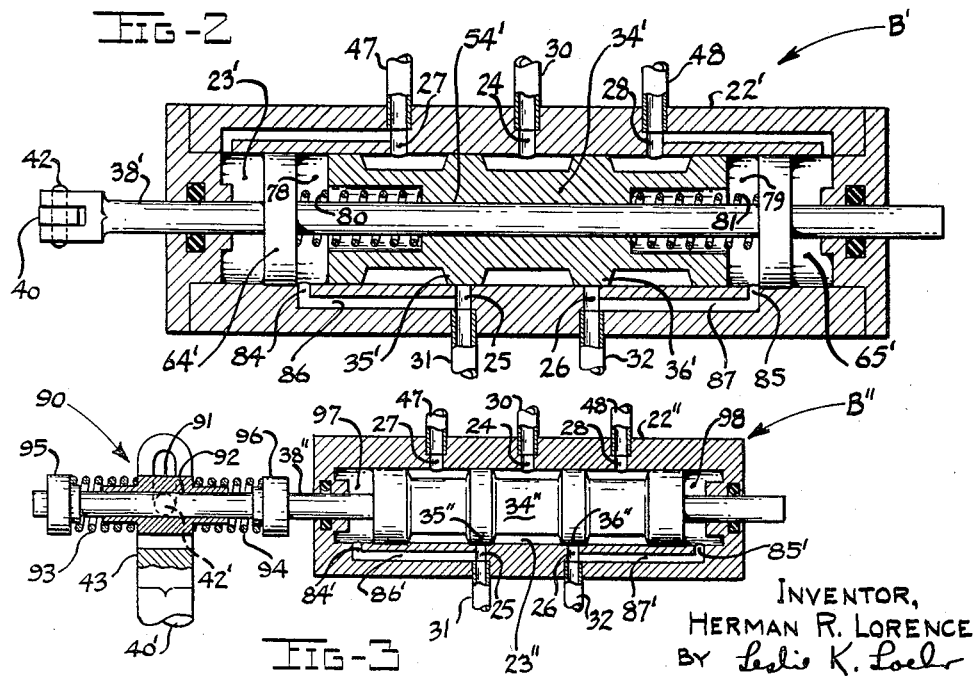

2,922,400

HYDRAULIC SERVOMECHANISM WITH FEED-BACK-ENERGY-DISSIPATING CONTROL VALVE

Herman R. Lorence, Palos Verdes Estates, Calif., assignor to Hughes Tool Company, Aircraft Division, Houston, Tex., a corporation of Delaware Application April 13, 1956, Serial No. 578,093

5 Claims. (Cl. 121—41)

This invention relates to piston-type hydraulic servomechanisms, and more particularly to such servomechanisms and the control valves employed therein for actuating aerodynamic flight-directional-control elements of modern aircraft.

One of the problems frequently encountered in the use of servomechanisms for selectively positioning aircraft flight-directional-control elements arises from the fact that, because of the mechanical connection between such elements and their servomotors, inertia and/or extraneous forces provide these elements with faculties for feeding energies back to the servomotors of the mechanisms, which feedback energies operate to not only aggravate aircraft-flight-control, but to also induce hazardous operational difficulties.

In an aircraft having a hydraulic servomechanism with a piston-type servomotor for driving a control element, feedback energies in the piston-driven element become forces acting to drive motor piston causing the latter to produce hydraulic pressure within the servomotor and, at the same time, to actuate the control valve which, in turn, supplies hydraulic pressure to the motor piston such as to further oppose the feedback energies and to provide forces that reverses both piston and control element movements. Thus, a cycle of energy-transfer is established and repeated in rapid succession such as to become a condition of flutter in the control element, which condition, if not controlled, can easily attain disaster producing proportions.

The present invention contemplates a hydraulic servomechanism for positioning a variably loaded element, which mechanism includes a source of hydraulic pressure, a piston-type servomotor, a control valve, and a selectively operable actuator constructed and cooperatively arranged such that the control valve moves independently of actuator movement and in response to the hydraulic pressure resulting from element feedback energy so as to release this pressure and, at the same time, apply pressure from the source to the servomotor piston such as to quickly equalize the forces acting on the motor piston, whereby a moving aircraft-control element is quickly brought to an at-rest condition with no accompanying rebound. Moreover, if the final at-rest condition of the flight-control element is not in agreement with the selected position of the selectively operable actuator, the valve is so constructed that hydraulic pressure from the source is automatically and correctly applied to the servomotor piston to produce the change required to effect agreement between the selected actuator position and the at-rest position of the flight-control element.

Accordingly, it is a primary object of this invention to provide a hydraulic servomechanism for selectively positioning a movable member, which mechanism is characterized by ability to automatically dissipate member-developed feedback energy in a manner such as to avoid vibration of the movable member and its supporting structure.

It is another object to provide such a servomechanism in which the servomotor includes a double-acting power piston drivingly connected to a movable member such that feedback energy developed in the member tends to drive the piston and produce hydraulic pressure in the motor, and to provide a valve responsive to the piston-produced pressure for automatically releasing this pressure.

It is another object to provide such a servomechanism in which the control valve is mechanically operated for applying hydraulic pressure from a source to either side of the servomotor power piston, and is hydraulically operated by hydraulic pressure produced in the motor by the feedback energy for releasing the latter pressure.

It is another object to provide a hydraulic servomechanism for selectively positioning a flight-directional-control element of an airplane, which mechanism is characterized by its ability to prevent a fluttering condition from developing in the control element while the airplane is in flight.

It is a further object to provide such a servomechanism with a servomotor which includes a double-acting power piston drivingly connected to a flight-directional control element of an airplane such that feedback energy developed in the control element tends to drive the power piston and produce hydraulic pressure in the motor, and to provide this servomotor with a control valve which is selectively operated by a mechanical servolinkage and a selectively operable actuator for effecting selective actuation of the control element, and which is automatically operated by the hydraulic pressure produced in the servomotor for releasing such pressure and preventing control-element flutter.

It is an additional object to provide such a control valve with a movable valve element coupled to the motor piston and the selectively operable actuator through a servolinkage such that the valve element can move independently of the actuator and the piston in response to the fluid pressure produced in the servomotor by feedback energy developed in the flight-directional-control element.

It is a further object to provide a control valve for a hydraulic servomotor having a double-acting piston, which is characterized by its ability to respond to motor-piston-produced hydraulic pressure for hydraulically effecting an equalized condition of the forces acting on said piston.

These and other objects and advantages will become more apparent from the following description considered in connection with the accompanying drawings which illustrate the novel features of this invention for descriptive purposes only and which are not intended as a definition of the limits thereof.

Fig. 1 is a sectional view schematically illustrating a servomechanism embodying the features of this invention;

Fig. 2 is a sectional view of a modification of the control valve employed in Fig. 1; and Fig. 3 is a sectional view of another modification of the control valve employed in Fig. 1.

In general, the servomechanism illustrated in Fig. 1 comprises a servomotor A and a control valve B cooperatively interconnected by a servolinkage C which is coupled to a selectively operable actuator D schematically representing any one of several conventional actuators adapted for manual and/or automatic operations. For purposes of description, the servomechanism is shown as part of an aircraft flight-directional-control system of which servomotor A includes a hydraulic cylinder 8 having a double-acting power piston 12 fixed to a piston rod 14 connected by pin 15 to an arm 17 drivingly attached to an aircraft flight-directional-control element, such as an elevator 18.

Cylinder 8 is connected to a hydraulic pressure source 20 by means of control valve B which comprises a housing 22 having a cylindrical bore or valve chamber 23 provided with an inlet opening 24, a pair of work ports 25 and 26, and a pair of return openings 27 and 28 of which inlet opening 24 is connected to the source of hydraulic pressure by conduit 30, and work ports 25 and 26 are respectively connected by conduits 31 and 32 to ends 9 and 10 of cylinder 8 as shown; and a generally cylindrical valve spool 34 slidably mounted within chamber 23 and normally disposed in a central position wherein lands or cylindrical portions 35 and 36 of the valve spool respectively block ports 25 and 26 with regard to the inlet and return openings, said spool being movable to the right and left of the central position for alternately providing interconnecting passageways between the work ports and the inlet and return openings for purposes hereinafter described.

Movement of the valve spool 34 is normally effected by a push rod 38 drivingly associated with the valve spool and drivenly connected to selectively operable actuator D through servolinkage C, which linkage comprises a lever 40 connected by pins 41 and 42 to ends 16 and 39 of piston rod 14 and push rod 38, respectively, and an element 44 of actuator D pivotally connected by a pin 45 to lever 40 intermediate the ends of the lever.

Under operating conditions, the servomechanism is completely charged with hydraulic fluid, that is, cylinder 8 on both sides of piston 12, and all passageways interconnecting the hydraulic pressure source with the cylinder are filled with liquid. Thus desired movement of piston rod 14, controlled by valve B, is effected by the entrance of hydraulic fluid into cylinder 8 on one side of piston 12 and the exit of hydraulic fluid from the cylinder on the other side of the piston simultaneously. However, when spool 34 is centrally positioned in valve chamber 23 of valve B, ports 25 and 26 are blocked and hydraulic fluid is trapped in cylinder 8 of motor A on both sides of piston 12, which fluid provides resistance against piston movement resulting from forces externally applied to the piston rod to the full extent that any such movement of the piston produces hydraulic pressure in cylinder 8 on either side of piston 12 depending upon the direction of the movement.

When movement of elevator 18 in the direction indicated by arrow 50 is necessary to effect a change in the position of the elevator, actuator D is selectively operated so as to cause movement of element 44 in the direction indicated by arrow 51, which, in turn, causes lever 40 to rotate in a clockwise direction about pin 41 and thereby move push rod 38 and valve spool 34 to the right in chamber 23 of housing 22. Movement of spool 34 to the right will cause cylindrical portions 35 and 36 to uncover work ports 25 and 26 and establish fluid-conducting passageways interconnecting hydraulic pressure source 20 with cylinder 8 such that hydraulic pressure enters the cylinder on the left-hand side of piston 12 via conduit 30, inlet opening 24, work port 26, and conduit 32; and such that hydraulic fluid on the right-hand side of piston 12 is allowed to return to the source 20 via conduit 31, work port 25, return opening 27, and conduit 47.

Hydraulic pressure entering cylinder 8 on the left-hand side of piston 12 moves the piston and piston rod to the right which drives elevator 18 in the direction of arrow 50 a distance determined by actuator D and proportional to the movement of element 44 because of the inherent function of lever 40 which operates in response to piston movement such as to cause valve spool 34 to block work ports 25 and 26 and stop the flow of the hydraulic pressure causing the piston movement. In other words, when element 44 has reached the end of the movement predetermined by actuator D, servomotor A operates control valve B through servolinkage C to stop servomotor movement and thereby fix elevator 18 in a new position.

When movement of the elevator in the direction indicated by arrow 52 is necessary to effect a position change in that direction, actuator D is operated so as to cause movement of element 44 in the direction indicated by arrow 53, which, in turn, moves push rod 38 and valve spool 34 to the left in chamber 23 of housing 22 and establishes fluid-conducting passageways through the control valve whereby fluid pressure enters cylinder 8 on the right-hand side of piston 12 via conduit 30, inlet opening 24, work port 25, and conduit 31; and whereby hydraulic fluid on the left-hand side of piston 12 is allowed to return to the source 20 via conduit 32, work port 26, return opening 28, and conduit 48. Applying hydraulic pressure to the right-hand side of piston 12 causes the piston and piston rod to drive elevator 18 to a new position according to the new location of element 44, as selected by actuator D. Once the new position is reached servomotor A automatically stops itself in a manner similar to that previously described.

Thus, the degree of movement of elevator 18 about axis 19 is a function of actuator D and is proportional to the amount of movement of element 44, and the different positions of the elevator correspond to different positions of pin 45 along a line 46, which pin becomes the fulcrum for lever 40 in the valve-closing operation performed by piston 12 and rod 14 whereby valve spool 34 is returned to its normal central position in valve chamber 23 with cylindrical portions 35 and 36 in port-blocking relationship with respect to work ports 25 and 26, as shown. Moreover, optimum sensitivity is provided when a minimum amount of movement is required of the power piston to close the control valve, thus the dimensional proportions of different servomechanisms may vary with respect to each other according to different installations. However, it is to be assumed that, once the position of pin 45 along line 46 has been fixed by element 44 of actuator D, the movement required of piston 12 for causing spool 34 to block working ports 25 and 26 is an acceptable minimum in keeping with the overall design parameters of the airplane flight-control system.

In selectively positioning elevator 18 by the servomechanism above described, no difficulties arise from the initial phase of the operation, that is, when control valve B is opened and hydraulic pressure from the source causes servomotor A to gradually accelerate the elevator from an at-rest condition in accordance with well known mechanical laws, nothing unusual occurs; however, in the final phase of the operation, when control valve B closes to fix a new position of elevator 18, serious problems can and do occur because of the kinetic energy of the moving elevator. In other words, fixing elevator 18 in a position involves blocking work ports 25 and 26 by cylindrical portions 35 and 36 of valve spool 34; a condition which not only interrupts the flow of hydraulic pressure from source 20 to servomotor A, but it also stops the return of hydraulic fluid from the servomotor to the source and traps hydraulic fluid in cylinder 8 on both sides of piston 12. Now, under these circumstances and because of the positive mechanical connection between elevator 18 and piston 12, the kinetic energy of the moving elevator becomes a driving force applied to the piston, which force is expended in producing positive hydraulic pressure in cylinder 8 on one side of piston 12 and causing a negative pressure on the other side of the piston. This transfer of energy back and forth between elevator 18 and servomotor A results in a vibrating or fluttering condition of the elevator that has a tendency to accumulate in magnitude and not only aggravates airplane directional control, but frequently attains proportions such as to bring disaster to the airplane.

To avoid such vibrating or fluttering conditions of hydraulic servo-operated flight-directional-control elements of an airplane, the present invention provides improvements in the structure of the control valve whereby the movable element of valve B operates independently of any movement of actuator D and/or servolinkage C, which operation results from hydraulic pressure produced in servomotor A by kinetic energy or feedback energy in the flight-control elements, as hereinafter described.

In Fig. 1, valve spool 34 is provided with a coextensive axial bore 54 enlarged at each end such as to form piston chambers 59 and 60 having bottom walls 61 and 62. As illustrated, push rod 38 extends axially inward of valve chamber 23 through end wall 21 of housing 22 so that a medial portion of the push rod slidably engages bore 54. Pistons 64 and 65, drivenly fixed to push rod 38, are slidably mounted in piston chambers 59 and 60 such as to cooperate with end walls 61 and 62 to provide oppositely variable chambers at the ends of valve spool 34. Extending radially outward from piston chambers 59 and 60, near end walls 61 and 62, radial openings 57 and 58 cooperate with annular grooves 55 and 56 in the periphery of cylindrical portions 35 and 36 of valve spool 34 to provide fluid-conducting passageways interconnecting work ports 25 and 26 with piston chambers 59 and 60, respectively, while the valve spool is centrally positioned in chamber 23, as shown. Moreover, it is to be noted that, with spool 34 centrally positioned in valve chamber 23, the distance between the pistons and bottom walls 61 and 62 are substantially equal. This relationship between the valve spool and push rod 38 is yieldably maintained by springs 70 and 71 abuttingly interposed between the ends of said spool and collars 72 and 73 suitably fixed to the push rod.

It was previously stated that, under operating conditions, the servomechanism is completely charged with hydraulic fluid; accordingly, radial openings 57 and 58, grooves 55 and 56, and the variable chambers between the end walls and pistons 64 and 65 are filled with liquid. With these conditions in mind, let it be assumed that elevator 18 is moving downwardly in the direction of arrow 52 to a new position and, that servomotor A and servolinkage C has just returned valve spool 34 to its normal central position; thus, in accordance with the earlier-described modes of operation, the driven condition of elevator 18 by servomotor A has now been changed to a driven condition of the servomotor piston by the elevator. In other words, the kinetic or feedback energy in the moving elevator is driving piston 12 to the left in cylinder 8, and is being expended in producing hydraulic pressure in the cylinder on the left-hand side of the piston; while the pressure-producing movement of the piston in cooperation with the servolinkage is causing push rod 38 to move to the right.

Since annular groove 56 is aligned with work port 26, the piston-produced hydraulic pressure in cylinder 8 is instantly transmitted via conduit 32, work port 26, groove 56, and radial opening 58 into piston chamber 60 between end wall 62 and piston 65 where it cooperates with said end wall and piston to effect a movement of valve spool 34 to the left in valve chamber 23 against the force of spring 70 and in the opposite direction to movement of push rod 38 which is being driven to the right by power piston 12. Upon the movement of valve spool 34 to the left, hydraulic pressure produced in cylinder 8 on the left-hand side of piston 12 is released via conduit 32, work port 26, return opening 28, and conduit 48 to hydraulic pressure source 20. Simultaneously with the pressure release, hydraulic pressure from source 20 is admitted to cylinder 8 on the right-hand side of piston 12 via conduit 30, inlet opening 24, work port 25, and conduit 31. Accordingly, hydraulic fluid is not only expelled from that portion of cylinder 8 on the left-hand side of piston 12, but hydraulic fluid is added to the cylinder portion on the right-hand side of the piston in an amount equal to the quantity expelled. This condition quickly dissipates the hydraulic pressure and the energy therein produced on the left-hand side of piston 12 within cylinder 8, which, in effect, dissipates the kinetic or feedback energy in elevator 18. Moreover, this release of piston-produced pressure reduces the pressure in the space between piston 65 and end wall 62 of chamber 60 so that the forces acting on spool 34 are soon equalized and the spool is returned to its normal relationship with respect to push rod 38 by the action of springs 70 and 71. In returning to its normal position on push rod 38, valve spool 34 also moves within valve chamber 23 such that cylindrical portions 35 and 36 are again in blocking relationship with respect to work ports 25 and 26.

Attenuating the kinetic or feedback energy of a moving element, such as elevator 18, is not only a question of releasing piston-produced hydraulic pressure from servomotor A, but it is also a question of introducing hydraulic pressure from source 20 into the servomotor cylinder behind the element-driven piston to prevent the occurrence of negative pressure in this portion of cylinder 8, and to maintain hydraulic pressure in the space between piston 64 and end wall 61 of chamber 59 for effecting the return of spool 34 to its normal relationship with respect to push rod 38.

If the dissipation of the feedback energy has effected a material change downward of elevator 18 from its desired at-rest position, valve spool 34, in returning to its normal relationship with respect to push rod 38, moves to the right in valve chamber 23 and provides passageways interconnecting hydraulic pressure source 20 with cylinder 8 such that hydraulic pressure from the source enters the cylinder on the left-hand side of piston 12 and such that hydraulic fluid returns to the source from that portion of the cylinder on the right-hand side of the piston; thus, piston 12 is driven to the right and elevator 18 is driven upward. When the error is corrected the servolinkage returns push rod 38 and valve spool 34 to their normal positions wherein work ports 25 and 26 are blocked by cylindrical portions 35 and 36.

It is to be noted that springs 70 and 71 materially affect the energy-dissipating faculties of the valve, since their functional characteristics determine the magnitude of the hydraulic pressure required for moving spool 34 with respect to push rod 38, the amount of such spool movement, and the ability of the spool to return to its normal relationship with respect to the push rod when the actuating pressure has been reduced; hence, the selection of springs is a matter of choice depending upon design limitations in the valve, the amount of energy to be dissipated, and the time allotted for such dissipation.

The control valve illustrated in Fig. 2 and identified by reference character B' is similar to control valve B embodied in the servomechanism of Fig. 1 in that it is constructed to perform the same function; for instance, lever 40 of servolinkage C is connected to the end of push rod 38' for effecting the operation of valve B' by the selectively operable actuator D and the servomotor A. In other words, push rod 38' responds to the movement of servolinkage C in exactly the same manner as push rod 38 previously described in connection with Fig. 1.

Control valve B' comprises a housing 22' having a cylindrical valve chamber 23' with an inlet opening 24, a pair of work ports 25 and 26, and a pair of return openings 27 and 28 all of which are respectively adapted for connection to hydraulic pressure source 20 and hydraulic cylinder 8 by conduits 30, 31, 32, 47 and 48, as indicated in Fig. 1. A valve spool 34' is slidably mounted within valve chamber 23' and is normally disposed in a central position wherein cylindrical portions 35' and 36' of the valve spool respectively block work ports 25 and 26 with regard to the inlet and return openings, as shown, but is movable to the right and left of the normal central position for alternately providing interconnecting fluid-conducting passageways between the work ports and the inlet and return openings to effect a change in position of a movable element, such as elevator 18, in the manner previously set forth in connection with the description of valve spool 34 of control valve B in Fig. 1.

Valve spool 34' of valve B' is provided with a coextensive axial bore 54' adapted to form a sliding fit with push rod 38' which extends axially through valve chamber 23' and the ends of housing 22', as shown. Pistons 64' and 65' drivenly fixed to push rod 38' at opposite ends of spool 34' are also slidably mounted in valve chamber 23' so as to cooperate with the ends of the valve spool to provide variable spaces 78 and 79 in the valve chamber at the ends of the spool. Springs 80 and 81, abuttingly interposed between pistons 64' and 65' and the bottom walls of the counterbores in the ends of spool 34', are adapted to yieldably maintain the spool in a normal position on push rod 38' such that spaces 78 and 79 are substantially equal under normal operation conditions, particularly when the valve spool has been returned to its normally central position in the valve chamber by the servolinkage. Hydraulic fluid is supplied to spaces 78 and 79 through by-pass ports 84 and 85 respectively connected to work ports 25 and 26 by means of fluid-conducting passageways 86 and 87. By-pass ports 84 and 85 are positioned in the wall of valve chamber 23' to register with spaces 78 and 79 while valve spool 34' is centrally positioned with cylindrical portions 35' and 36' in blocking relationship with respect to the work ports.

Let it be assumed that control valve B' is incorporated in the servomechanism of Fig. 1; that the mechanism is completely charged with hydraulic fluid, that is, cylinder 8 on both sides of piston 12 of servomotor A, spaces 78 and 79 in valve B', and all passageways interconnecting hydraulic pressure source 20 with said cylinder are filled with liquid; that servomotor A and servolinkage C have just returned valve spool 34' to its normal position blocking ports 25 and 26 during a change in the position of elevator 18 in the direction of arrow 50; and that kinetic energy in the moving elevator is causing the elevator to drive power piston 12 to the right in cylinder 8: now, under these conditions hydraulic fluid is trapped in cylinder 8 on both sides of piston 12 and the energy driving the piston is being expended in producing hydraulic pressure in the cylinder on the right-hand side of the piston, which pressure flowing through conduit 31 enters space 78, via passageway 86 and by-pass port 84, and moves valve spool 34' to the right against the force of spring 81 such that work port 26 is fluid-conductively connected to inlet opening 24; whereupon piston-produced hydraulic pressure in cylinder 8 on the right-hand side of piston 12 is returned to source 20 and hydraulic pressure from said source is admitted to cylinder 8 on the left-hand side of piston 12. Releasing the piston-produced pressure dissipates the hydraulic energy therein, as well as the energy in the elevator; moreover, when the value of this pressure has dropped sufficiently, spring 81 returns valve spool 34' to its normal relationship with respect to push rod 38' and to port-closing relationship in valve chamber 23' wherein cylindrical portions 35' and 36' block work ports 25 and 26. If, however, a material change has been effected in the final at-rest position of the elevator during energy dissipation, the servolinkage will have moved push rod 38' such that valve spool 34', in returning to its normal relationship with respect to the push rod, will be in position whereby work ports 25 and 26 are respectively connected to inlet opening 24 and return opening 28. Thus, hydraulic pressure from source 20 will be applied to power piston 12 of the servomotor A to effect correction of the error in elevator position.

Fig. 3 illustrates another control valve identified by reference character B", which, as a substitute for control valve B, may be incorporated in the servosystem shown in Fig. 1. Control valve B" comprises a housing 22" having a cylindrical valve chamber 23" with an inlet opening 24, a pair of work ports 25 and 26, and a pair of return openings 27 and 28 all of which are respectively adapted for connection to hydraulic pressure source 20 and hydraulic cylinder 8 by conduits 30, 31, 32, 47 and 48, as indicated in Fig. 1. A valve spool 34" is slidably mounted within valve chamber 23" and is normally disposed in a central position wherein cylindrical portions 35" and 36" of the valve spool respectively block work ports 25 and 26 with regard to the inlet and return openings, as shown, but is movable to the right and left of the normal central position for alternately providing interconnecting fluid-conducting passageways between the work ports and the inlet and return openings to effect a change in the position of a movable element, such as elevator 18 in a manner similar to that previously set forth in connection with the description of valve spool 34 of control valve B in Fig. 1.

Movement of spool 34" is normally effected by a push rod 38" which extends axially through the spool, valve chamber 23", and the end walls of housing 22", and is fixedly connected to spool 34" so that either one can drive the other. Movement of push rod 38" is normally effected by servolinkage C through a slidable connection 90 comprising a block 91 having a bore 92 in sliding engagement with rod 38" and trunnions 42' at right angles to the bore in force-transmitting engagement with slots in the bifurcated upper end 43 of lever 40', as indicated by the sectional illustration of block 91 and upper end 43; and springs 93 and 94 abuttingly interposed between block 91 and collars 95 and 96 suitably fixed to push rod 38" so that movement of lever 40' is transmitted to valve spool 34". Springs 93 and 94 cooperate to yieldably maintain block 91 centrally positioned with respect to collars 95 and 96 which are located on push rod 38" in a fixed relationship with respect to housing 22" and valve spool 34" so that, when lever 40' is in valve-closing position, block 91 is centrally positioned between collars 95 and 96 and valve spool 34" is centrally positioned in valve chamber 23", as illustrated.

Movement of spool 34" to the right or left of its normal central position in valve chamber 23" is also effected by forces applied to the ends of the spool resulting from hydraulic pressure admitted to variable spaces 97 and 98 between the end walls of the valve chamber and the ends of the spool, through by-pass ports 84' and 85' positioned as shown in the side wall of the valve chamber and respectively connected to work ports 25 and 26 by means of fluid-conducting passageways 86' and 87'.

For the purpose of describing the operation of control valve B", let it be assumed that this valve is incorporated in the servomechanism of Fig. 1; that the mechanism is completely charged with hydraulic fluid, which means that cylinder 8 on both sides of piston 12 of servomotor A, spaces 97 and 98 in valve B", and all passageways interconnecting hydraulic pressure source 20 with said cylinder are filled with liquid; that servomotor A and servolinkage C have just returned valve spool 34" to its normal position blocking work ports 25 and 26 during a change in the position of elevator 18 in the direction of arrow 52; and that kinetic energy in the moving elevator is causing the elevator to drive power piston 12 to the left in cylinder 8: now, under these conditions hydraulic fluid is trapped in cylinder 8 on both sides of piston 12 and the energy driving the piston is being expended in producing hydraulic pressure in the cylinder on the left-hand side of the piston, which pressure flowing through conduit 32 enters space 98, via passageway 87' and by-pass port 85', and moves valve spool 34" to the left against the force of spring 94 such that work port 26 is fluid-conductively connected to return opening 28 and work port 25 is fluid-conductively connected to inlet opening 24; whereupon piston-produced hydraulic pressure in cylinder 8 on the left-hand side of piston 12 is returned to source 20 and hydraulic pressure from said source is admitted to cylinder 8 on the right-hand side of piston 12. Releasing the piston-produced pressure from cylinder 8 dissipates the hydraulic energy therein and thus dissipates or attenuates the energy in the elevator. Furthermore, when the value of this pressure has decreased sufficiently, spring 94 returns valve spool 34" to its normal relationship with respect to end 43 of lever 4 and to port-closing relationship in valve chamber 23" wherein cylindrical portions 35" and 36" again block work ports 25 and 26. If a material change has been effected in the final at-rest position of elevator 18 during energy dissipation, the servolinkage will have moved push rod 38" so that valve spool 34", in returning to its normal relationship with respect to the end of lever 40, will be in position whereby work ports 25 and 26 are respectively connected to outlet opening 27 and inlet opening 24. Thus hydraulic pressure from source 20 will be applied to power piston 12 of the servomotor A to effect correction of the error in elevator position. It is to be noted that, because of the slidable connection 90 push rod 38" and valve spool 34" are permitted to move as a unitary structure independently of movement of lever 40', that is, the spool and rod can move while the lever is stationary.

An important feature of this invention common to control valves B, B' and B" resides in the fact that, during valve-spool movement in response to hydraulic pressure produced in hydraulic cylinder 8 and before work ports 25 and 26 are unblocked, the spaces or chambers associated with the ends of the valve spool, in effect, operate to receive from and return to cylinder 8 equal quantities of hydraulic fluid to prevent the occurrence of unfilled space in cylinder 8 behind a moving power piston. For example, in valve B, as fluid enters the space between piston 65 and end wall 62 in response to hydraulic pressure produced on the left-hand side of piston 12 in servomotor A an equal amount of fluid is expelled from the space between piston 64 and end wall 61, which fluid in effect enters the servomotor on the right-hand side of piston 12. Similarly in control valve B', as hydraulic fluid enters space 79, a like amount is expelled from space 78; and in control valve B", as fluid enters space 98, the same quantity is expelled from space 97.

Attention is also directed to the fact that, in valves B and B', movement of the valve spools from their neutral or central position by element 44 of selectively operable actuator D is accomplished without resistance from the hydraulic pressures they control; hence, these valves are classified accordingly, as balanced valves. In valve B", the conditions of operation are slightly different because the stationary end walls of housing 22" cooperate with the valve spool to form spaces 97 and 98; thus, when valve spool 34" is moved to the left by lever 40 some resistance to such movement is caused by the fact that fluid expelled from space 97 through by-pass port 84' causes hydraulic pressure in cylinder 8 on the right-hand side of piston 12, which, in turn, moves piston 12 to the left and elevator 18 in the direction of arrow 52. This resistance to spool movement provides actuator D with a characteristic commonly referred to as "feel"; however, this "feel" characteristic completely disappears with spool 34" at the end of its stroke, because the spool not only operates to uncover the work ports but it also operates to simultaneously cover by-pass port 84' so that the passageway between space 97 and port 25 is blocked to prevent the exit or entrance of fluid from space 97.

Although valves B, B' and B" have been described in connection with feedback energy involved in the deceleration of an aircraft flight-directional-control element, it is to be understood that this is not intended as a limitation of the use of these valves since they will function equally well in response to feedback energy resulting from a force or combination of forces externally applied to the elevator as well as from momentum. Furthermore, while a hydraulic servosystem employing a piston-type motor for driving a movable member was selected because of its simplicity, it is to be understood that the use of valves B, B' and B" is not limited to servomechanisms with piston-type motors; since these valves will function equally well in any servomechanism having a motor capable of producing hydraulic pressure when driven by the movable member whether the energy in said member results from momentum or external forces acting thereon.

What is claimed as new is:

1. In an aircraft flight-directional-control system having a movable member characterized by variably-loaded aerodynamic flight-control surfaces and ability to develop feedback energy, a servomechanism for selectively positioning the movable member and automatically dissipating the feedback energy, said servomechanism comprising: a source of hydraulic fluid pressure; a servomotor having a double-acting piston reciprocably responsive to fluid pressure from the source and drivingly connected to the movable member such that feedback energy developed in said member tends to drive the piston and produce fluid pressure in the servomotor independently of the fluid-pressure source; and actuating means for controlling the servomotor such as to selectively position the movable member and automatically dissipate the fluid pressure produced by feedback energy in the movable member, said actuating means including a valve fluid-conductingly connecting the source of fluid pressure and the servomotor, and a selectively operable actuator coupled to the valve and the servomotor piston such that movement of the actuator opens the valve to effect movement of the piston and such that said piston movement is effective for automatically closing said valve when the piston has moved a distance proportional to actuator movement; said valve comprising a housing having a cylindrical bore with inlet and return openings fluid-conductively connected to the fluid-pressure source and first and second work ports fluid-conductively connected to the servomotor for selectively directing fluid pressure from the source to either side of the double-acting piston; a cylindrical valve element disposed in a central position within the housing bore and having first and second cylindrical portions respectively closing the first and second work ports in said central position, said valve element being conditioned for sliding movement from said central position for selectively connecting the inlet and return openings with said first and second ports; and means associated with the selectively operable actuator and the valve element for effecting movement of said element independently of said actuator and in response to fluid pressure in the servomotor produced by feedback energy, said means including a pair of fluid-receiving pressure chambers having variable capacities associated with said valve element such that pressurized fluid entering one chamber causes movement of said valve element accompanied by an increase in the capacity of said one chamber and a corresponding decrease in the capacity of the other chamber, passageways communicating with the servomotor and the pair of chambers such that one of said chambers receives fluid pressure from one side of the servomotor piston and the other side of said servomotor piston receives fluid pressure from the other of said chambers when said motor piston is driven by the feedback energy, and a yieldable connection between the valve element and the actuator permitting relative movement of said element with respect to said actuator.

2. In an aircraft flight-directional-control system having a movable member characterized by variably-loaded aerodynamic flight-control surfaces and ability to develop feedback energy, a servomechanism for selectively positioning the movable member and automatically dissipating the feedback energy, said servomechanism comprising: a source of hydraulic fluid pressure; a servomotor having a double-acting piston reciprocably responsive to fluid pressure from the source and drivingly connected to the movable member such that feedback energy developed in said member tends to drive the piston and produce positive and negative fluid pressures in the servomotor on the opposite sides of said piston independently of the fluid-pressure source; and first means for controlling the servomotor such as to selectively position the movable member and automatically dissipate fluid pressure produced by feedback energy in said movable member, said first means including a valve fluid-conductingly connecting the source of fluid pressure and the servomotor, and a selectively operable actuator coupled to the valve and the servomotor piston such that movement of the actuator opens the valve to effect movement of the piston and such that said piston movement is effective for automatically closing said valve when the piston has moved a distance proportional to actuator movement; said valve comprising a housing having a cylindrical bore with inlet and return openings fluid-conductively connected to the fluid-pressure source and first and second work ports fluid-conductively connected to the servomotor for selectively directing fluid pressure from the source to either side of the motor piston, a valve spool centrally positioned within the housing bore, having first and second cylindrical portions respectively closing the first and second work ports, but movable from the central position for selectively connecting the inlet and return openings with said first and second ports, said valve spool having a coextensive axial bore adapted to provide the ends of said spool with opposing piston chambers having opposing bottom walls, and second means interconnecting the valve spool and the selectively operable actuator for effecting movement of said spool independently of actuator movement and in response to feedback energy developed in the movable member, said second means including passageways through the first and second cylindrical portions of said valve spool fluid-conductingly connecting the work ports with the valve-spool piston chambers for transmitting fluid from the servomotor to said piston chambers while said valve spool is substantially centrally positioned, and a pair of pistons fixedly associated with each other and slidably associated with said piston chambers such that the entrance in one of said chambers of the positive fluid pressure produced in the servomotor by feedback energy is effective for moving the valve spool with respect to the pistons and independently of actuator movement to provide communication between the work ports and the inlet and return openings to provide for an exchange of hydraulic pressures between the servomotor and the source of hydraulic pressure.

3. The servomechanism defined in claim 2 in which the second means is characterized by spring means normally maintaining the valve-spool pistons in equally spaced relationship with respect to the bottom walls of the valve-spool piston chambers, said spring means being adapted to return the valve spool to its normal relationship with respect to the pistons when the fluid pressures produced in the servomotor by feedback energy has attained a preselected value.

4. In an aircraft flight-directional-control system having a movable member characterized by variably-loaded aerodynamic flight-control surfaces and ability to develop feedback energy, a servomechanism for selectively positioning the movable member and automatically dissipating the feedback energy, said servomechanism comprising: a source of hydraulic fluid pressure; a servomotor having a double-acting piston reciprocably responsive to fluid pressure from the source and drivingly connected to the movable member such that feedback energy developed in said member tends to drive the piston and produce fluid pressure in the servomotor independently of the fluid-pressure source; and first means for controlling the servomotor such as to selectively position the movable member and automatically dissipate fluid pressure produced by feedback energy in said movable member, said first means including a valve fluid-conductingly connecting the source of fluid pressure and the servomotor, and a selectively operable actuator coupled to the valve and the servomotor such that movement of the actuator opens the valve to effect movement of the motor piston and such that said piston movement is effective for automatically closing said valve when the piston has moved a distance proportional to actuator movement; said valve comprising a housing having a cylindrical bore with inlet and return openings fluid-conductively connected to the fluid-pressure source and first and second work ports fluid-conductively connected to the servomotor for selectively directing fluid pressure from the source to either side of the motor piston, a valve spool centrally positioned within the housing bore, having first and second cylindrical portions respectively closing the first and second work ports, but movable from the central position for selectively connecting the inlet and return openings with said first and second ports, and second means interconnecting the valve spool and the selectively operable actuator whereby movement of said valve spool can be effected independently of actuator movement and in response to feedback energy developed in the movable member, said second means including a pair of piston elements mechanically connected to the actuator and slidably associated with the bore of the valve housing and the valve spool such that the wall of the bore, the ends of the valve spool, and said piston elements constitute cylindrical fluid-pressure chambers of variable axial length at the ends of said valve spool, a pair of springs abuttingly interposed between the piston elements and the valve-spool ends for transmitting actuator movement to the valve spool and for equalizing the normal axial length of the variable fluid-pressure chambers, and passageways associated with the valve housing fluid-conductingly connecting the first and second work ports with said fluid-pressure chambers while the valve spool is centrally positioned in the housing bore such that fluid pressure produced on either side of the servomotor piston is effective for moving the valve spool independently of actuator movement so that the inlet and return openings are connected to the first and second work ports such as to dissipate the fluid pressure produced on one side of said motor piston and direct fluid pressure from the fluid-pressure source to the other side of said motor piston.

5. In an aircraft flight-directional-control system having a movable member characterized by variably-loaded aerodynamic flight-control surfaces and ability to develop feedback energy, a servomechanism for selectively positioning the movable member and automatically dissipating the feedback energy, said servomechanism comprising: a source of hydraulic fluid pressure; a servomotor having a double-acting piston reciprocably responsive to fluid pressure from the source and drivingly connected to the movable member such that feedback energy developed in said member tends to drive the piston and produce fluid pressure in the servomotor independently of the fluid-pressure source; and control means for controlling the servomotor such as to selectively position the movable member and automatically dissipate fluid pressure produced by movable-member feedback energy, said control means including a valve fluid-conductingly connecting the source of fluid pressure and the servomotor, and a selectively operable actuator coupled to the valve and the servomotor such that movement of the actuator opens the valve to effect movement of the motor piston and such that said piston movement is effective for automatically closing said valve when the piston has moved a distance proportional to actuator movement; said valve comprising a housing having a closed-ends cylindrical bore with inlet and return openings fluid-conductively connected to the fluid-pressure source and first and second work ports fluid-conductively connected to the servomotor for selectively directing fluid pressure from the source to either side of the motor piston, a generally cylindrical valve element slidably mounted within the housing bore in chamber-forming spaced relationship with respect to the closed ends thereof and normally positioned centrally of the bore in port-closing relationship with respect to the first and second work ports, but selectively movable for selectively connecting the inlet and return openings to said work ports, said element being further characterized by ability to movingly respond to fluid pressure admitted to the chambers between the ends of said element and the ends of the housing bore, coupling means interconnecting the valve element and the selectively operable actuator having spring means adapted for transmitting actuator movement to said valve element and for permitting movement of said element independently of actuator movement, and means for causing the valve element to move independently of actuator movement and in response to fluid pressure developed on either side of the servomotor piston by feedback energy so as to dissipate such fluid pressure and said feedback energy, said last named means including the chambers formed by the ends of the valve element and the ends of the housing bore and fluid-conducting passageways associated with the valve housing interconnecting said chambers and the first and second work ports so that fluid pressure produced by motor-piston movement is automatically admitted to one of the chambers for effecting valve-element movement such as to release this piston-produced fluid pressure and dissipate the energy causing the same.

References Cited in the file of this patent

UNITED STATES PATENTS

| | | |
|---|---|---|
| 439,716 | Atkins | Nov. 4, 1890 |
| 949,559 | Wilson | Feb. 15, 1910 |
| 2,210,916 | Kenyon et al. | Aug. 13, 1940 |
| 2,210,917 | Kenyon et al. | Aug. 13, 1940 |
| 2,596,242 | Hill | May 13, 1952 |

FOREIGN PATENTS

| | | |
|---|---|---|
| 948,925 | France | Feb. 7, 1949 |